United States Patent
Caulfield et al.

(10) Patent No.: US 11,397,584 B2
(45) Date of Patent: Jul. 26, 2022

(54) TRACKING SPECULATIVE DATA CACHING

(71) Applicant: Arm Limited, Cambridge (GB)

(72) Inventors: Ian Michael Caulfield, Cambridge (GB); Peter Richard Greenhalgh, Cambridge (GB); Frederic Claude Marie Piry, Cagnes sur Mer (FR); Albin Pierrick Tonnerre, Nice (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/043,963

(22) PCT Filed: Mar. 21, 2019

(86) PCT No.: PCT/GB2019/050803
§ 371 (c)(1),
(2) Date: Sep. 30, 2020

(87) PCT Pub. No.: WO2019/202288
PCT Pub. Date: Oct. 24, 2019

(65) Prior Publication Data
US 2021/0026641 A1    Jan. 28, 2021

(30) Foreign Application Priority Data
Apr. 17, 2018  (GB) .................................... 1806247

(51) Int. Cl.
*G06F 9/38*       (2018.01)
*G06F 12/0871*   (2016.01)
(Continued)

(52) U.S. Cl.
CPC ........ *G06F 9/3842* (2013.01); *G06F 9/30047* (2013.01); *G06F 9/3861* (2013.01); *G06F 12/0871* (2013.01); *G06F 12/0891* (2013.01)

(58) Field of Classification Search
CPC ..................................................... G06F 9/3842
See application file for complete search history.

(56) References Cited

U.S. PATENT DOCUMENTS 6,487,637 B1   11/2002   Arimilli et al.
7,606,979 B1   10/2009   Rozas et al.
(Continued)

OTHER PUBLICATIONS

"Cache Speculation Side-channels", ARM, Whitepaper, Feb. 2018, Version 1.2, 13 pages.
(Continued)

*Primary Examiner* — Michael J Metzger
(74) *Attorney, Agent, or Firm* — Nixon & Vanderhye P.C.

(57) ABSTRACT

An apparatus and method of operating a data processing apparatus are disclosed. The apparatus comprises data processing circuitry to perform data processing operations in response to a sequence of instructions, wherein the data processing circuitry is capable of performing speculative execution of at least some of the sequence of instructions. A cache structure comprising entries stores temporary copies of data items which are subjected to the data processing operations and speculative execution tracking circuitry monitors correctness of the speculative execution and responsive to indication of incorrect speculative execution to cause entries in the cache structure allocated by the incorrect speculative execution to be evicted from the cache structure.

11 Claims, 8 Drawing Sheets

(51) Int. Cl.
*G06F 12/0891* (2016.01)
*G06F 9/30* (2018.01)

(56) References Cited

U.S. PATENT DOCUMENTS

| | | |
|---|---|---|
| 7,774,531 B1 | 8/2010 | Karlsson |
| 2012/0144126 A1 | 6/2012 | Nimmala et al. |
| 2013/0019083 A1* | 1/2013 | Cain, III ............. G06F 11/1492 712/203 |
| 2014/0095809 A1 | 4/2014 | Moll et al. |
| 2014/0317361 A1 | 10/2014 | Dally |
| 2015/0149733 A1 | 5/2015 | Rozas et al. |
| 2015/0154106 A1* | 6/2015 | Pusdesris ................ G06F 9/384 711/154 |
| 2017/0177365 A1* | 6/2017 | Doshi ................. G06F 9/30087 |

OTHER PUBLICATIONS

Combined Search and Examination Report for GB Application No. 1806247.1 dated Oct. 25, 2018, 6 pages.
International Search Report and Written Opinion of the ISA for PCT/GB2019/050803 dated Jun. 14, 2019, 14 pages.

* cited by examiner

| SPECULATION TRACKING | | | |
|---|---|---|---|
| VALID | SPECULATION INFORMATION | INDEX | WAY |
|  |  |  |  |

FIG. 3A

| DATA CACHE | | |
|---|---|---|
| MESI STATUS | EVICT ? | CACHE LINE |
|  |  |  |

FIG. 3B

| SPECULATION TRACKING | | | |
|---|---|---|---|
| VALID | SPECULATION INFORMATION | $ ENTRY | EVICT ? |
|  |  |  |  |

FIG. 4A

| DATA CACHE | | |
|---|---|---|
| MESI STATUS | SPECULATIVE | CACHE LINE |
|  |  |  |

FIG. 4B

TRACKING SPECULATIVE DATA CACHING

This application is the U.S. national phase of International Application No. PCT/GB2019/050803 filed Mar. 21, 2019 which designated the U.S. and claims priority to GB Patent Application No. 1806247.1 filed Apr. 17, 2018, the entire contents of each of which are hereby incorporated by reference.

The present technique relates to the field of data processing. In particular it relates to speculative execution in a data processing apparatus.

A data processing apparatus which performs data processing operations in response to a sequence of instructions may execute at least some of those instructions speculatively. Speculative execution refers to the process of executing instructions beyond a branch, before the outcome of that branch is definitively known. Where the data processing apparatus is able, with sufficient accuracy, to predict the outcome of the branch based on previous outcomes, it is more efficient for the apparatus to speculatively continue execution of instructions on the assumption that the predicted outcome of the branch will occur, running the risk that occasionally the speculation will be incorrect and the speculatively executed instructions must be "undone". This presents an approach which overall is more efficient that waiting until the branch outcome is known before proceeding. Such a data processing apparatus may also be provided with at least one cache, to store temporary copies of data items which are the subject of its data processing operations.

At least some examples provide an apparatus comprising: data processing circuitry to perform data processing operations in response to a sequence of instructions, wherein the data processing circuitry is capable of performing speculative execution of at least some of the sequence of instructions; a cache structure comprising entries to store temporary copies of data items which are subjected to the data processing operations; and speculative execution tracking circuitry to monitor correctness of the speculative execution and responsive to an indication of incorrect speculative execution to cause entries in the cache structure allocated by the incorrect speculative execution to be evicted from the cache structure.

At least some examples provide a method of operating a data processing apparatus comprising: performing data processing operations in response to a sequence of instructions, wherein performing the data processing operations comprises performing speculative execution of at least some of the sequence of instructions; storing temporary copies of data items which are subjected to the data processing operations in entries of a cache structure; monitoring correctness of the speculative execution; and in response to an indication of incorrect speculative execution, causing entries in the cache structure allocated by the incorrect speculative execution to be evicted from the cache structure.

At least some examples provides an apparatus comprising means for performing data processing operations in response to a sequence of instructions, wherein performing the data processing operations comprises performing speculative execution of at least some of the sequence of instructions; means for storing temporary copies of data items which are subjected to the data processing operations in entries of a cache structure; means for monitoring correctness of the speculative execution; and means for causing entries in the cache structure allocated by the incorrect speculative execution to be evicted from the cache structure in response to an indication of incorrect speculative execution.

The present techniques will be described further, by way of example only, with reference to embodiments thereof as illustrated in the accompanying drawings, in which:

FIG. 1 schematically illustrates a data processing apparatus in one example embodiment;

FIG. 2A schematically illustrates a data processing apparatus in one example embodiment;

FIG. 2B schematically illustrates a data processing apparatus in one example embodiment;

FIG. 3A shows information held by speculative execution tracking circuitry in one example embodiment;

FIG. 3B shows information held in association with cache lines in a data cache in one example embodiment;

FIG. 4A shows information held by speculative execution tracking circuitry in one example embodiment;

FIG. 4B shows information held in association with cache lines in a data cache in one example embodiment;

Figure 5A:
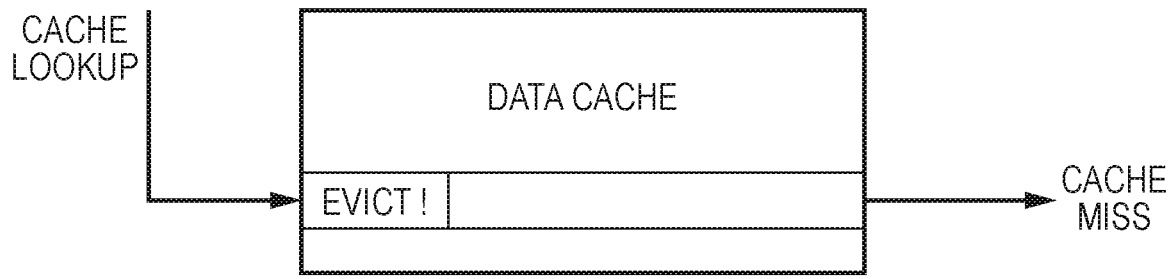
Figure 5B:
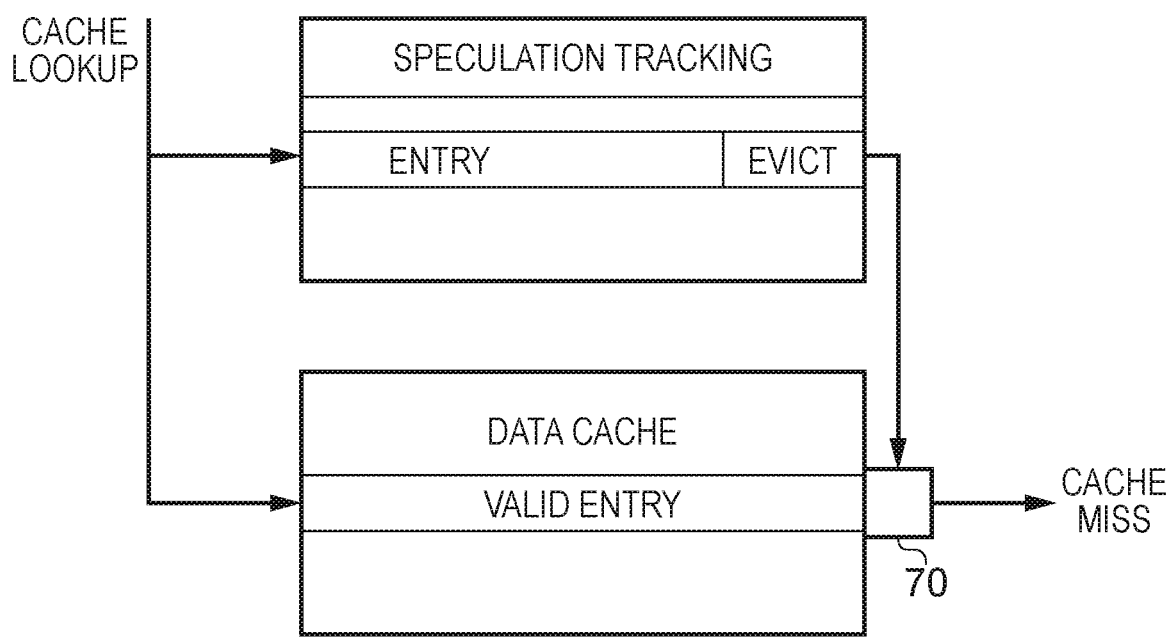
Figure 6:
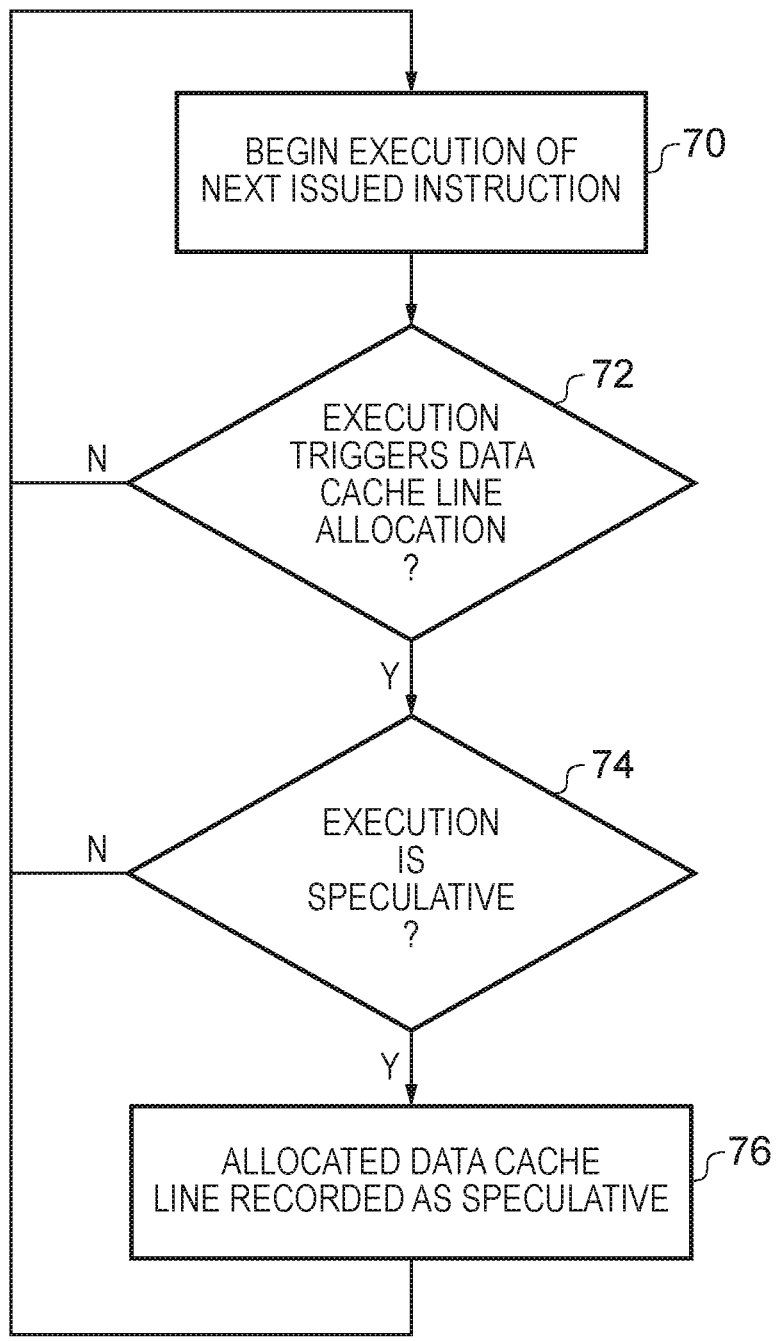
Figure 7:
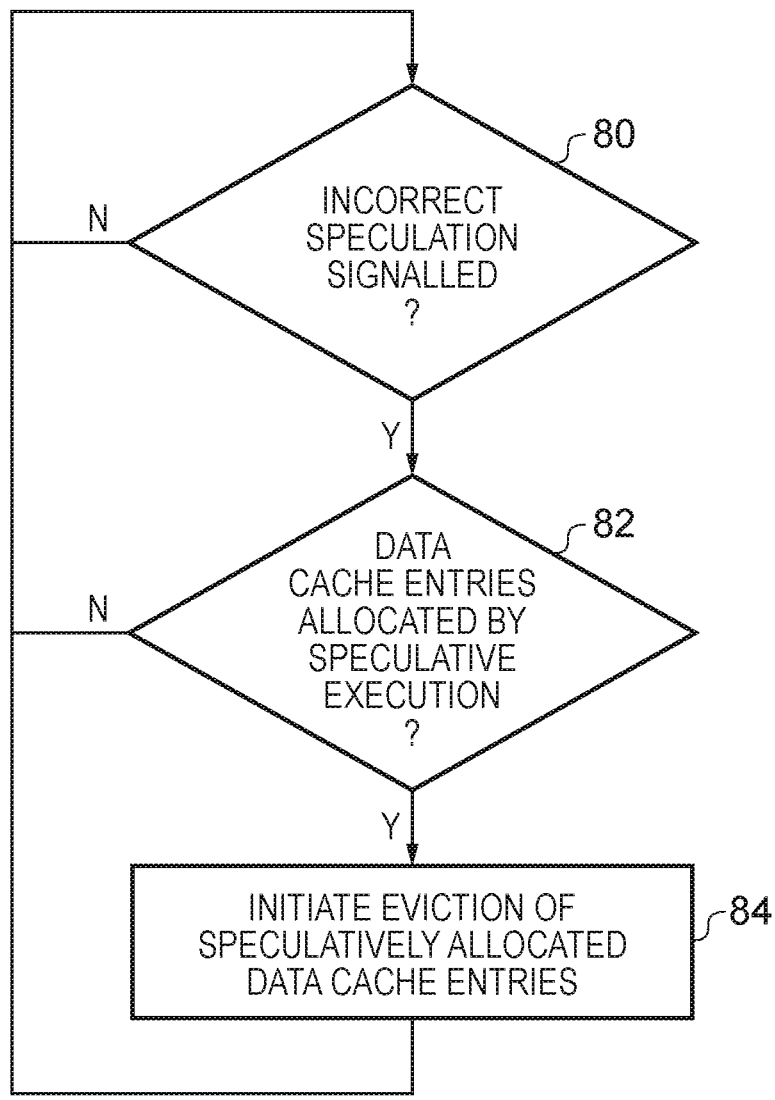

FIGS. 5A and 5B schematically illustrate a cache lookup procedure in a data cache in example embodiments;

FIG. 6 is a flow diagram showing a process by which cache lines are allocated in a data cache in one example embodiment; and FIG. 7 is a flow diagram showing how certain data cache entries are evicted in one example embodiment.

At least some embodiments provide an apparatus comprising data processing circuitry to perform data processing operations in response to a sequence of instructions, wherein the data processing circuitry is capable of performing speculative execution of at least some of the sequence of instructions; a cache structure comprising entries to store temporary copies of data items which are subjected to the data processing operations; and speculative execution tracking circuitry to monitor correctness of the speculative execution and responsive to an indication of incorrect speculative execution to cause entries in the cache structure allocated by the incorrect speculative execution to be evicted from the cache structure.

Both the provision of a cache to store temporary copies of data items and speculative instruction execution are both established techniques in the field of data processing to improve performance. However, the present techniques recognise that, in combination, these two features of a data processing apparatus may in fact present a vulnerability, for example where malicious software seeks to direct the speculative execution in order to cause data cache allocations with an address which depends on some secret data (data to which that malicious software should not have access). Cache probing techniques (side-channel attacks) may then be able to discover some of the address bits of the cache allocations, thus rendering the secret data vulnerable. In the light of this recognition, the present techniques propose that speculative execution tracking circuitry of the apparatus monitors the speculative execution of instructions being carried out and when incorrect speculative execution is established causes any entries in a data cache which were allocated as a result of the (now known to be) incorrect speculative execution to be evicted from the cache. As a result, the above mentioned cache probing techniques cannot determine information relating to the secret data, since by the time such cache probing techniques are attempted, the speculative execution which caused the relevant entries in the cache to be allocated will already have been determined as incorrect and therefore those entries have already been evicted from the cache.

The speculative execution tracking circuitry may take a variety of forms, but in some embodiments the speculative execution tracking circuitry comprises an entry for each instruction speculatively executed by the data processing circuitry and for which correctness of the speculative execution of the instruction is not yet resolved, wherein each said entry comprises an indication of whether the speculative execution of the instruction caused an allocation of at least one entry in the cache structure. In other words therefore, where the apparatus already comprises a mechanism for monitoring the speculative execution, this may be adapted to indicate whether the speculative execution of each instruction has caused an allocation in the cache. This may for example be in the form of a data structure which provides a sequence of entries corresponding to a sequence of instructions on the speculative path and each of these may further be annotated to indicate whether that instruction has caused allocation in the cache. Reference to this structure can then be made, when the incorrect speculative execution is established, in order to cause those allocations in the cache to be evicted.

Generally the present techniques propose that in such speculative execution tracking circuitry an entry which corresponds to a speculative executed instruction can indicate that the instruction has caused allocation of at least one entry in the cache, but in some embodiments more detail with respect to the cache allocations may be indicated. Accordingly in some embodiments each said entry comprises an indication of the at least one entry in the cache structure which was allocated as a result of the speculative execution of the instruction. Thus one or more specific entries in the cache structure can be identified from the speculative execution tracking circuitry entry and accordingly those specific entries may then be caused to be evicted if that instruction is subsequently determined to have been incorrectly speculatively executed.

Eviction of certain entries in the cache structure may be performed in a variety of ways. In some embodiments the speculative execution tracking circuitry is responsive to the indication of incorrect speculative execution to mark the entries in the cache structure allocated by the incorrect speculative execution to be evicted from the cache structure. In other words, the first response of the apparatus to the indication of incorrect speculative execution may be to mark certain entries in the cache structure for eviction, before that eviction is actually carried out. This approach recognises that carrying out the eviction from the cache structure may take some time and a faster response to the incorrect speculative execution may reliably be provided by marking those entries immediately to show that they will be evicted and therefore can already be treated differently beforehand.

Whilst entries in the speculative execution tracking circuitry may correspond to individual speculatively executed instructions, in some embodiments the speculative execution tracking circuitry comprises entries each corresponding to at least one entry in the cache structure which was allocated as a result of speculative execution. This correspondence between entries in the speculative execution tracking circuitry and entries in the cache structure which were allocated as a result of speculative execution facilitates the identification of those entries in the cache, such that if such speculative execution is established, the administration of their eviction is facilitated.

For example, in some embodiments the speculative execution tracking circuitry is responsive to the indication of incorrect speculative execution to mark as invalid the entries in the speculative execution tracking circuitry corresponding to at least one entry in the cache structure which was allocated by the incorrect speculative execution. Thus, by marking those entries as invalid, reference to the speculative execution tracking circuitry information can quickly establish whether a given entry in the cache structure will be evicted (even if such an eviction has not yet been carried out).

In some embodiments each entry in the cache structure comprises an indication of whether the entry was allocated as a result of speculative execution.

As mentioned above, there may be an interval between the indication of incorrect speculative execution (and the response of the apparatus to initiate eviction of certain entries from the cache) and those evictions taking place. In this context, in some embodiments, the cache structure is responsive to a lookup in the cache structure received after the indication of incorrect speculative execution and before the entries in the cache structure allocated by the incorrect speculative execution have been evicted from the cache structure, when the lookup corresponds to the entries in the cache structure allocated by the incorrect speculative execution, to generate a cache miss response to the lookup. In other words, the cache behaves as though the relevant entries are not there and responds with a cache miss. This may be achieved either by the marking of entries in the speculative execution tracking circuitry to indicate that those cache structure entries will be evicted or by marking of the entries in the cache structure themselves as to-be-evicted. In consequence even cache lookups which very closely follow the indication of incorrect speculative execution also cannot derive information related to allocations in the cache made as a result of incorrect speculative execution.

In some embodiments eviction of entries in the cache allocated as part of a sequence of speculative execution is facilitated by ensuring that the allocated entry is "clean" with respect to a cache coherency protocol. This means that, if the entry is to be evicted, this can happen more directly, without any cache coherency update needing to be carried out first.

The speculative execution tracking circuitry may be provided in various configurations and associated with, or forming part of, various components of the apparatus. In some embodiments the apparatus further comprises load-store circuitry to carry out memory access operations and to maintain an outstanding memory access instructions data structure, wherein the outstanding memory access instructions data structure comprises an entry for each outstanding memory access instruction, and wherein the load-store circuitry comprises the speculative execution tracking circuitry. Thus, where a load-store unit may be provided as part of the apparatus to administer memory accesses and is arranged to keep track of memory access instructions which it is handling, it is proposed that the tracking of speculatively executed instructions may be performed as part of the load-store unit. For example, a data structure which the load-store unit maintains to keep track of the memory access instructions may be modified according to the present techniques to further keep track of those instruction which have been speculatively executed and have caused a cache line allocation.

In some example embodiments there is a method of operating a data processing apparatus comprising: performing data processing operations in response to a sequence of instructions, wherein performing the data processing operations comprises performing speculative execution of at least some of the sequence of instructions; storing temporary copies of data items which are subjected to the data processing operations in entries of a cache structure; monitoring correctness of the speculative execution; and in response to an indication of incorrect speculative execution, causing entries in the cache structure allocated by the incorrect speculative execution to be evicted from the cache structure.

In some example embodiments there is an apparatus comprising: means for performing data processing operations in response to a sequence of instructions, wherein performing the data processing operations comprises performing speculative execution of at least some of the sequence of instructions; means for storing temporary copies of data items which are subjected to the data processing operations in entries of a cache structure; means for monitoring correctness of the speculative execution; and means for causing entries in the cache structure allocated by the incorrect speculative execution to be evicted from the cache structure in response to an indication of incorrect speculative execution.

Some particular embodiments are now described with reference to the figures.

Figure 1:
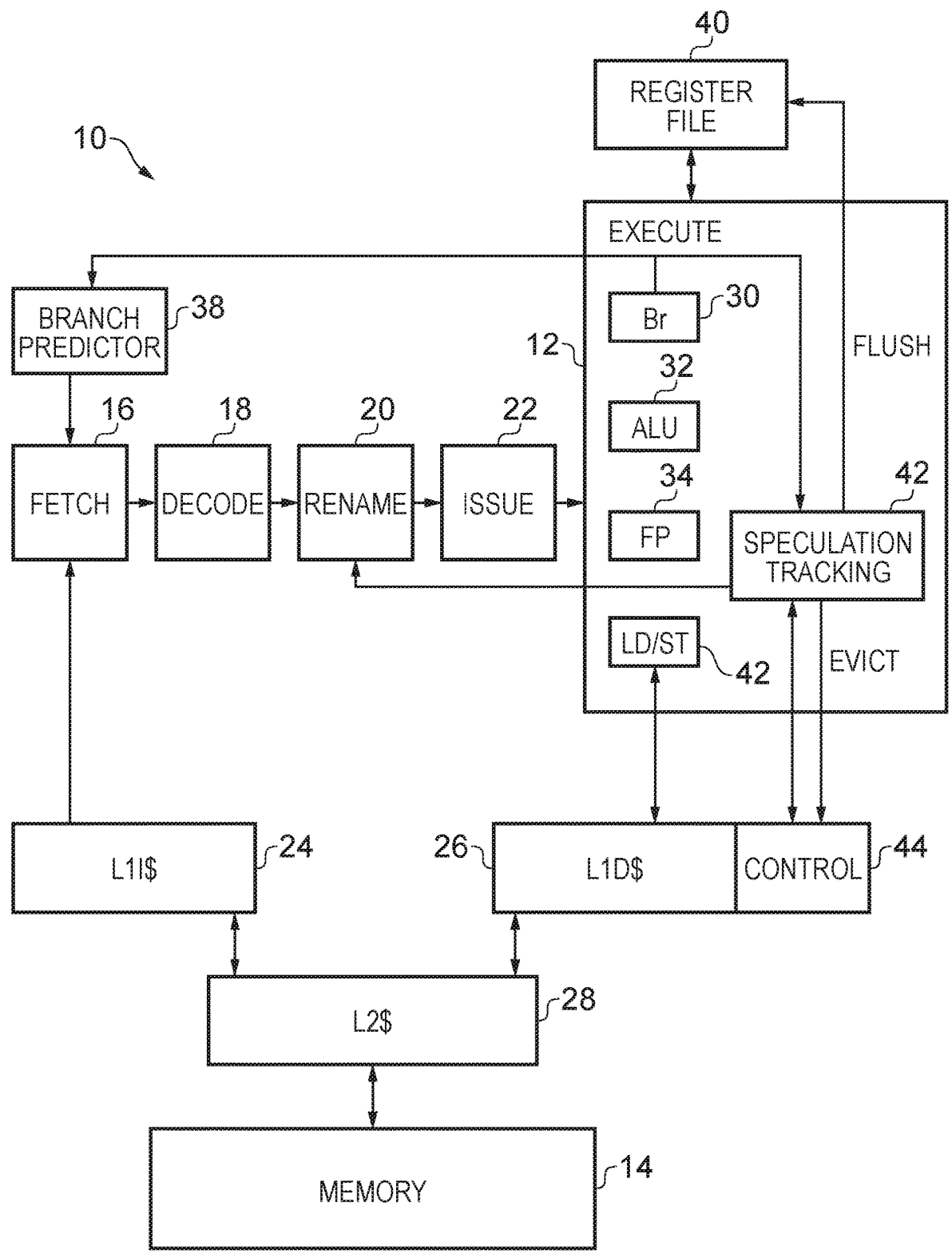

FIG. 1 schematically illustrates an apparatus 10 in one example embodiment. The apparatus comprises execution circuitry 12 which performs data processing operations defined by a sequence of instructions which the apparatus 10 is configured to retrieve from the memory 14. Instructions are caused to be retrieved from the memory 14 by fetch circuitry 16, where the fetch circuitry 16 forms part of a sequence of pipeline stages, namely the fetch stage 16, decode stage 18, renaming stage 20 and issue stage 22. To avoid the latency associated with the retrieval of instructions from the memory 14 a cache hierarchy is provided comprising level one (L1) instruction cache 24, level one (L1) data cache 26 and level two (L2) cache 28. Within the execution circuitry 12 there are functional capabilities as illustrated, namely a branch resolution unit 30, an arithmetic logic unit 32, a floating point unit 34 and a load/store unit 36. Depending on the nature of an instruction received from the issue stage 22 it will be handled by an appropriate execution unit amongst those shown. It will of course be appreciated that, merely for the purposes of clarity, the configuration of the execution circuitry 12 is only shown schematically at a high level of abstraction and further detail thereof, which is not of significance to the present techniques, is not given here. A notable feature however of the apparatus 10 is that it is capable of performing speculative execution of instructions. Whilst under some circumstances the fetch unit 16 will simply cause sequential instructions (sequential PC values) to be retrieved, the apparatus 10 also comprises branch predictor 38 which provides the fetch unit 16 with a prediction of whether a branch defined by a branch instruction which is encountered will be taken or not. Such prediction is performed on the basis of previous behaviour, and is a technique with which the skilled person is familiar and further detail therefore is not described here for brevity. Nevertheless, on the basis of a predicted branch outcome, the fetch unit 16 is arranged to fetch the corresponding sequence of instructions from memory, on the assumption that this branch prediction was correct. These instructions then pass through the pipelined stages and are executed by the relevant execution unit within the execution circuitry 12. Accordingly, in the manner of the execution of any instruction, the data processing operations carried out are performed with respect to values held in the register file 40 and may involve the retrieval of data from memory 14 (possibly stored in either the L2 cache 28 and/or the L1 data cache 26) by means of the load/store unit 36. In order to keep track of the execution and results of such speculatively executed instructions, the execution circuitry 12 further comprises speculation tracking circuitry 42, within which indications of each speculatively executed instruction are stored. This enables the apparatus, when the branch resolution unit determines the outcome of a branch to be different to that which had been predicted (i.e. incorrect speculative execution has been performed) to "wind back" the effects of the execution of the speculatively executed instructions. Accordingly, the speculation tracking circuitry 42 receives a signal from the branch resolution unit 30. This signal is also received by the branch predictor 38, informing it of the outcome of each resolved branch, such that the branch predictor 38 can continually update the branch history which it maintains. In response to the indication of incorrect speculative execution, the speculation tracking unit 42 sends a flush signal to various parts of the apparatus including the register file 40 and the renaming unit 20. For the purposes of enabling the unwinding of speculatively executed instructions the register file 40 maintains a checkpointed snapshot of any registers which might have to be amended. Thus, in response to the flush signal the renaming unit modifies the rename map which it maintains to point to the set of registers in the register file 40 which represent that checkpointed snapshot. In addition, and in accordance with the present techniques, the speculation tracking circuitry 42 also interacts with control circuitry 44 of the data cache 26. In particular, this communication enables the speculation tracking unit 42, in response to the signal received from the branch resolution 30 indicating that a certain set of instructions have been incorrectly speculatively executed, to cause entries in the data cache 26 which were allocated as a result of that incorrect speculative instruction execution to be evicted from the cache. Further detail of, and variants of, how this is proposed are described below with reference to the figures which follow.

Figure 2A:
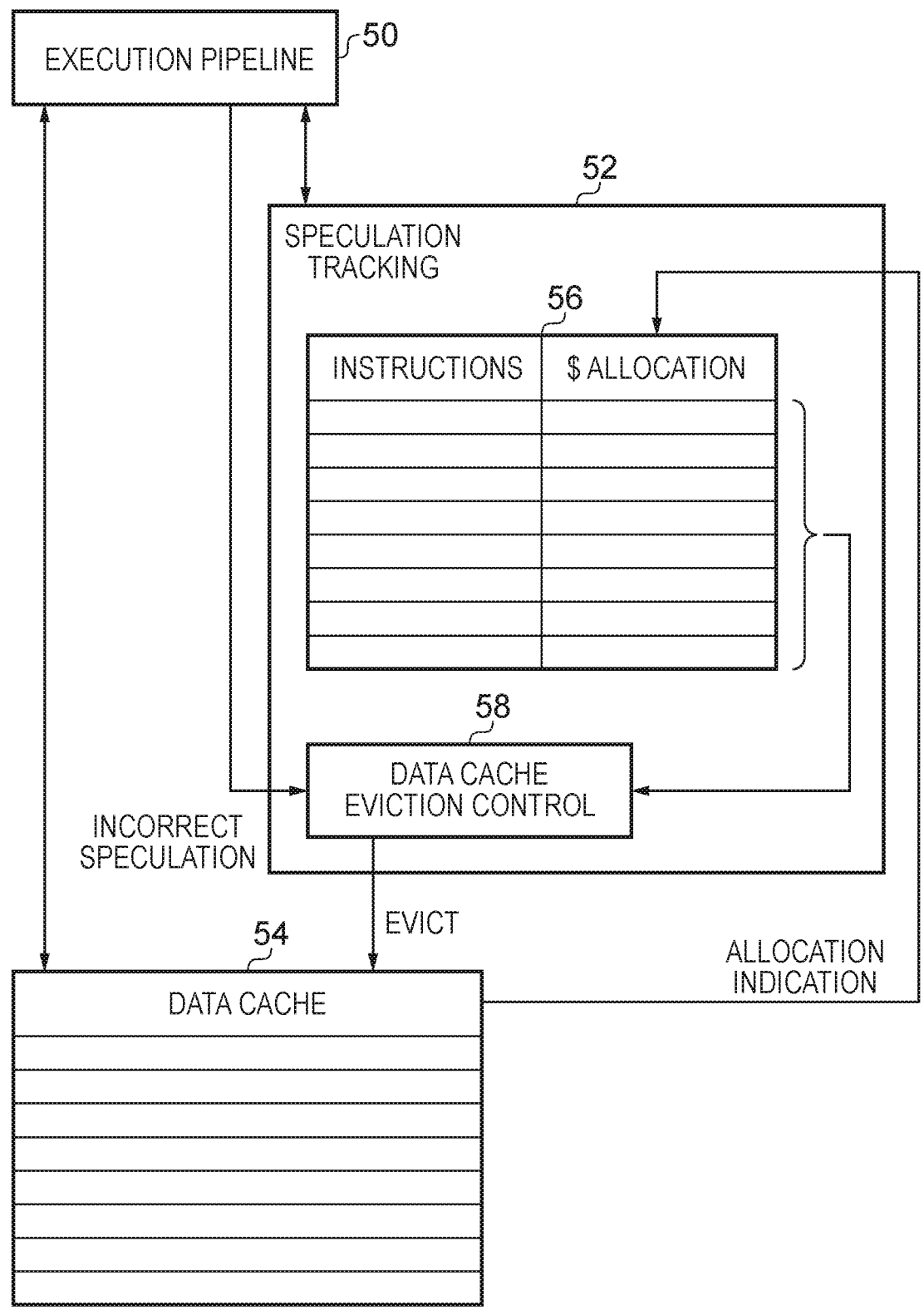

FIG. 2A schematically illustrates some components of an apparatus in one example embodiment. Generally, FIG. 2A comprises an execution pipeline 50, speculation tracking circuitry 52, and a data cache 54. The execution pipeline 50 performs data processing operations with respect to data values, some of which are cached in the data cache 54. Where the execution pipeline is arranged to perform speculative instruction execution, the speculation tracking circuitry 52 interacts with the execution pipeline 50 to monitor the speculative execution and in particular the speculation tracking circuitry 52 maintains a data structure 56, shown in FIG. 2A in form of a table, which indicates the current set of instructions known to have been speculatively executed, but for which it is not yet known whether that speculative execution was correct or not. Once an indication from the execution pipeline 50 is received by the speculation tracking circuitry 52 indicating that one or more speculatively executed instructions were correctly executed, the corresponding entries in the data structure 56 are removed. Further, the data structure 56 comprises an indication associated with each speculatively executed instruction to show whether that instruction caused the allocation of an entry in the data cache 54. For this purpose, the speculation tracking circuitry 52 receives allocation indications from the data cache 54 and when a cache line allocation indication corresponds to a speculatively executed instruction (i.e. was caused by speculative execution of that instruction), the corresponding entry in the data structure 56 is marked to indicate this. When an indication of incorrect speculative execution is received by the speculation tracking circuitry 52 from the execution pipeline, this is received by data cache eviction control circuitry 58, which references the data structure 56 and signals to the data cache 54 that cache lines allocated for those instructions now known to have been incorrectly speculatively executed and for which the cache line allocation marker is set, should be evicted from the data cache.

Figure 2B:
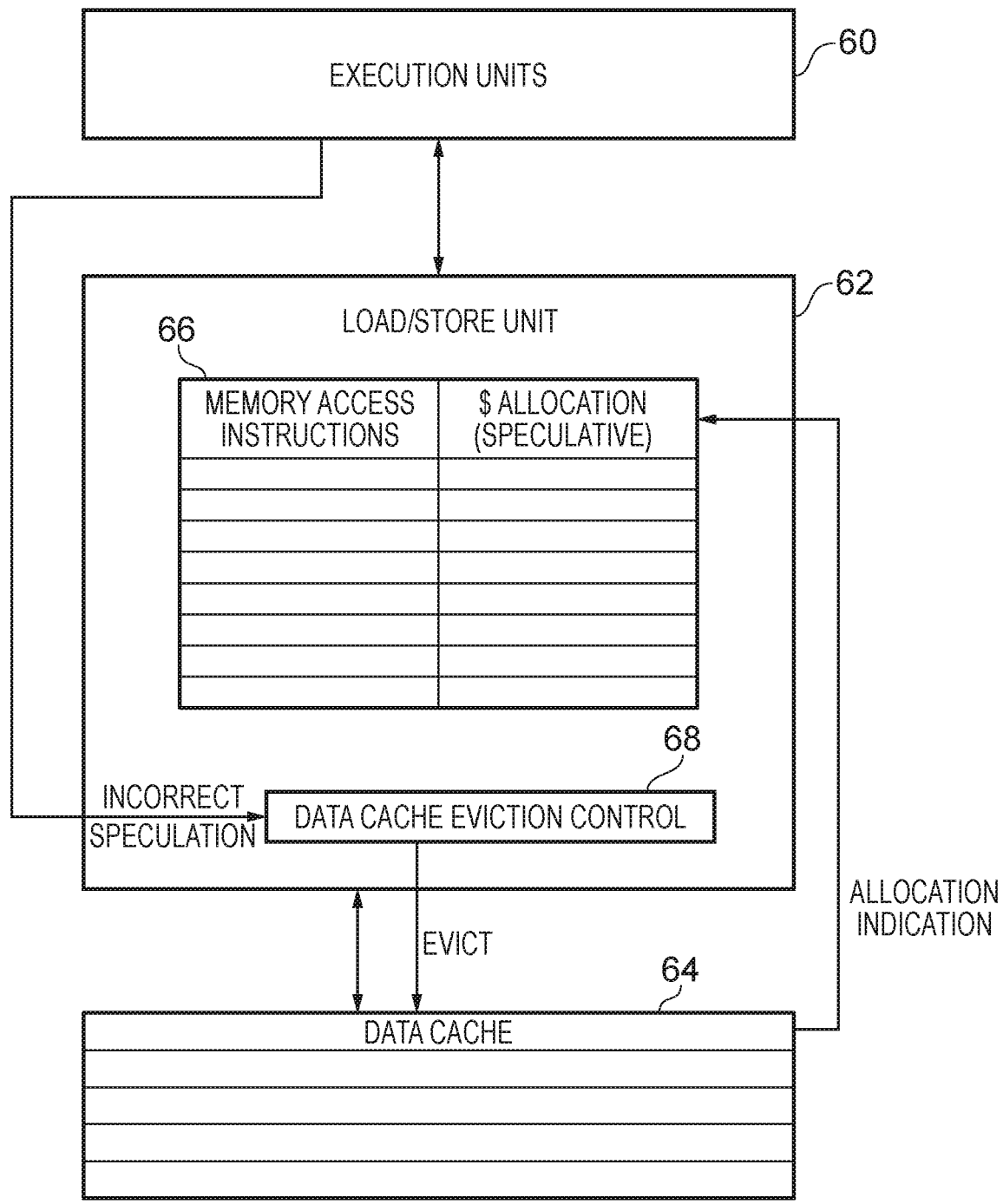

FIG. 2B schematically illustrates some components of an apparatus in one example embodiment. Generally, FIG. 2B comprises execution units 60, load/store circuitry 62, and a data cache 64. The execution units 60 performs data processing operations in response to instructions other than memory access instructions, whilst the load/store unit 62 carries out memory access operations in response to memory access instructions. Performing these memory access operations comprises access being made to the data cache 64. Moreover, access to the data cache 64, when a cache miss occurs, causes a cache line to be allocated for the requested data. The load/store unit comprises a data structure 66, which it uses to track memory access instructions which it is currently handling. As shown in FIG. 2B, this data structure also allows an indication to be stored in association with each entry for each memory access instruction to show if this access caused a cache allocation (noting that these indications are only maintained for speculatively executed instructions). The load/store unit 62 receives an allocation indication from the data cache 64 when a speculatively executed instruction has caused a cache line allocation. The corresponding entry in the data structure 66 is then marked to indicate this. If an indication from the execution units 60 is received by the load/store unit 62 indicating that one or more speculatively executed instructions were incorrectly executed, the corresponding entries, this is received by the data cache eviction control circuitry 68, which references the data structure 66 and signals to the data cache 64 that certain cache lines allocated for those instructions now known to have been incorrectly speculatively executed and for which the cache line allocation marker is set, should be evicted from the data cache.

FIG. 3A shows an example of the data structure maintained by the speculation tracking circuitry. As shown in the figure each entry comprises validity information, speculation information, and an indication of index and way information. Here the validity information serves the purpose of indicating the cache allocation indication, i.e. that the indicated index and way information identifies a cache line which was indeed allocated as a result of speculative instruction execution. The speculation information may comprise further information relating to one or more instructions which were speculatively executed. Accordingly with reference to this data structure it may be identified whether, for a given speculatively executed instruction or set of speculatively executed instructions, a cache line was allocated or not.

FIG. 3B shows a data cache in one example, in which a cache entry, i.e. a cache line, is stored in association with further information which indicates cache coherency (MESI) status of the cache line and an indication of whether this cache line is to be evicted. The provision of the cache coherency status in association with the cache line in the example of FIG. 3B recognises that this data cache may form part of a system of caches each of which may potentially store copies of the same data items retrieved from memory and this data cache is therefore arranged to participate in a defined cache coherency protocol for this system to ensure coherency between those potentially multiple copies of data items in the system. As part of this, in this example, the data cache is arranged to store an indication in association with each cache line showing its status with respect to that protocol, where here this is one of the set of states "MESI", i.e. modified, exclusive, shared, and invalid. In one example according to the present techniques the data cache is arranged to ensure that any cache lines allocated as a result of speculative instruction execution are stored in a "clean" state, i.e. where necessary mechanisms of the cache coherency protocol are immediately evoked upon allocation of this cache line to ensure that the cache line is then held in this "clean" status, in order that if a subsequent indication of incorrect speculative execution is received and this cache line should be evicted, there is no delay associated with needing to write back the modified content of this cache line to memory, or interact further with other data caches via the cache coherency protocol, and eviction of the cache line is effectively complete merely by marking it as invalid such that at the next opportunity this cache line may be selected at the location for a new allocation. The eviction indication stored in association with a cache line ("evict?") enables the data cache to quickly mark each relevant cache line as "to-be-evicted" on receipt of the corresponding eviction signal from the speculation tracking circuitry.

The particular distribution of information between the speculation tracking circuitry and the data cache need not be exactly as shown in the examples of FIG. 3A and FIG. 3B, and FIGS. 4A and 4B show other example embodiments which are contemplated. For example, in FIG. 4A the data structure maintained by the speculation tracking circuitry comprises entries which have the validity information, speculation information, cache entry indication information and eviction indications. Accordingly, (referencing FIG. 3A for comparison) it is to be noted that this data structure has the "cache entry" information in place of the index and way information in the example of FIG. 3A, and further comprises the eviction indication. The detail of the form of the cache entry information stored is not of significance, as long as it enables the specific cache line allocated as a result of speculative instruction execution to be identified. Maintaining the eviction indication in the data structure further means that reference to this entry may be made when access to the cache is required and an indication of eviction intention marked in association with an entry in this data structure can be used to modify the data cache response to a cache look up, as is described below with reference to FIG. 5B.

FIG. 4B shows an example configuration of a data cache in which in addition to the usual cache line information (i.e. the data itself) and its associated MESI status information, an indication may be stored showing that the cache line was allocated as a result of speculative instruction execution. This facilitates identification of data cache content allocated as a result of speculative instruction execution and the response of the data cache to an eviction signal. For example, one response of the data cache to the eviction signal received from the speculation tracking circuitry may be to evict all entries in the cache allocated as a result of speculative instruction execution, regardless of whether it is explicitly known whether those cache lines marked as speculative were allocated a result of the set of instructions now known to have been wrongly speculatively executed. This represents a performance choice, in that doing so may result in more entries in the cache being evicted than is strictly necessary to respond to the incorrect speculative instruction execution, but the simplicity of doing so and the assured security of evicting all such entries may be preferable in some implementation circumstances.

FIGS. 5A and 5B relate to cache look ups in the data cache. FIG. 5A schematically illustrates a configuration in which an entry in the data cache is marked as "to-be-evicted" such that when a cache look up is performed although the corresponding entry is identified this results in a cache miss by virtue of the eviction marker. FIG. 5B schematically illustrates a variant where the cache look up not only references the data cache itself, but also the speculation tracking data structure. Accordingly, when the cache look up process finds the corresponding entry in the speculation tracking data structure, which is marked as "to-be-evicted", then although the cache look up finds a valid entry which otherwise would generate a cache hit in the data cache, the matching of the entry in the speculation tracking data structure causes (by provision of logic 70) a cache miss signal.

FIGS. 6 and 7 are flow diagrams illustrating the steps of example methods. In particular FIG. 6 relates to a process according to which data cache lines may be allocated in the data cache as a result of speculative instruction execution and FIG. 7 illustrates a process by which data cache entries allocated by speculative execution may be evicted. As such it is important to note that the two processes described are not in any way mutually exclusive and indeed both processes can be viewed as being carried out concurrently with new allocations being made and other already existing entries being evicted. FIG. 6 may be considered to begin at step 70, where execution of the next issued instruction in the execution units of the apparatus begins. Then at step 72 it is determined if execution of that instruction has triggered a data cache line allocation. If it has not, then the flow returns to step 70 for the next issued instruction to be executed. If however at step 72 such data cache line allocation is determined to have occurred, then at step 74 it is determined if the instruction execution is speculative. If it is not then the flow returns to step 70. If it is however, then at step 76 the allocated data cache line is recorded as speculative. It will be appreciated with reference to the examples of the preceding figures that this "recording" may be made in some examples by marking the data cache line itself as speculative, whilst in other examples the speculative nature is recorded by virtue of an entry in the data structure maintained by the speculative tracking unit. The flow then returns to step 70.

FIG. 7 may be considered to begin at step 80 where it is determined if incorrect speculative execution has been signalled. If it has not the flow loops on itself at this step. When such incorrect speculative execution is signalled the flow proceeds to step 82 where it is determined if there are data entries allocated by speculative execution. If there are not the flow returns to step 80. If there are then the flow proceeds to step 84 where eviction of the speculatively allocated data cache entries is initiated. It will be appreciated with reference to the examples of the preceding figures that this may comprise eviction of all data cache entries allocated as a result of speculative instruction execution, or may comprise identifying those particular data cache entries allocated as a result of the particular instruction (or instructions) now known to have been wrongly speculatively executed.

In brief overall summary, an apparatus and method of operating a data processing apparatus are disclosed. The apparatus comprises data processing circuitry to perform data processing operations in response to a sequence of instructions, wherein the data processing circuitry is capable of performing speculative execution of at least some of the sequence of instructions. A cache structure comprising entries stores temporary copies of data items which are subjected to the data processing operations and speculative execution tracking circuitry monitors correctness of the speculative execution and responsive to an indication of incorrect speculative execution to cause entries in the cache structure allocated by the incorrect speculative execution to be evicted from the cache structure.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus comprising:
    data processing circuitry to perform data processing operations in response to a sequence of instructions, wherein the data processing circuitry is capable of performing speculative execution of at least some of the sequence of instructions;
    a cache structure comprising entries to store temporary copies of data items which are subjected to the data processing operations; and
    speculative execution tracking circuitry to monitor correctness of the speculative execution and responsive to an indication of incorrect speculative execution to cause entries in the cache structure allocated by the incorrect speculative execution to be evicted from the cache structure,
    wherein the speculative execution tracking circuitry comprises an entry for each instruction speculatively executed by the data processing circuitry and for which correctness of the speculative execution of the instruction is not yet resolved, and
    wherein each said entry for each instruction speculatively executed comprises an indication of whether the speculative execution of the instruction caused an allocation of at least one entry in the cache structure.

2. The apparatus of claim 1, wherein each said entry comprises an indication of the at least one entry in the cache structure which was allocated as a result of the speculative execution of the instruction.

3. The apparatus of claim 1, wherein the speculative execution tracking circuitry is responsive to the indication of incorrect speculative execution to mark the entries in the cache structure allocated by the incorrect speculative execution to be evicted from the cache structure.

4. The apparatus of claim 1, wherein the speculative execution tracking circuitry comprises entries each corresponding to at least one entry in the cache structure which was allocated as a result of speculative execution.

5. The apparatus of claim 1, wherein the speculative execution tracking circuitry is responsive to the indication of incorrect speculative execution to mark as invalid the entries in the speculative execution tracking circuitry corresponding to at least one entry in the cache structure which was allocated by the incorrect speculative execution.

6. The apparatus of claim 1, wherein each entry in the cache structure comprises an indication of whether the entry was allocated as a result of speculative execution.

7. The apparatus of claim 1, wherein the cache structure is responsive to a lookup in the cache structure received after the indication of incorrect speculative execution and before the entries in the cache structure allocated by the incorrect speculative execution have been evicted from the cache structure, when the lookup corresponds to the entries in the cache structure allocated by the incorrect speculative execution, to generate a cache miss response to the lookup.

8. The apparatus of claim 1, wherein the cache structure is arranged to cause an entry in the cache structure allocated by speculative execution to be stored in a clean state with respect to a cache coherency protocol.

9. The apparatus of claim 1, further comprising load-store circuitry to carry out memory access operations and to maintain an outstanding memory access instructions data structure, wherein the outstanding memory access instructions data structure comprises an entry for each outstanding memory access instruction, and wherein the load-store circuitry comprises the speculative execution tracking circuitry.

10. A method of operating a data processing apparatus comprising:
performing data processing operations in response to a sequence of instructions, wherein performing the data processing operations comprises performing speculative execution of at least some of the sequence of instructions;
storing temporary copies of data items which are subjected to the data processing operations in entries of a cache structure;
monitoring, by speculative execution tracking circuitry, correctness of the speculative execution; and
in response to an indication of incorrect speculative execution, the speculative execution tracking circuitry causing entries in the cache structure allocated by the incorrect speculative execution to be evicted from the cache structure,
storing, by the speculative execution tracking circuitry, an entry for each instruction speculatively executed by the data processing circuitry and for which correctness of the speculative execution of the instruction is not yet resolved,
wherein each said entry for each instruction speculatively executed comprises an indication of whether the speculative execution of the instruction caused an allocation of at least one entry in the cache structure.

11. An apparatus comprising:
means for performing data processing operations in response to a sequence of instructions, wherein performing the data processing operations comprises performing speculative execution of at least some of the sequence of instructions;
means for storing temporary copies of data items which are subjected to the data processing operations in entries of a cache structure;
means for monitoring correctness of the speculative execution; and
means for causing entries in the cache structure allocated by the incorrect speculative execution to be evicted from the cache structure in response to an indication of incorrect speculative execution,
wherein the means for monitoring comprises an entry for each instruction speculatively executed by the means for performing and for which correctness of the speculative execution of the instruction is not yet resolved,
wherein each said entry for each instruction speculatively executed comprises an indication of whether the speculative execution of the instruction caused an allocation of at least one entry in the means for storing.

* * * * *